(12) United States Patent
Richter-Lukesova et al.

(10) Patent No.: US 9,458,271 B2
(45) Date of Patent: Oct. 4, 2016

(54) CATALYST SYSTEM FOR THE PREPARATION OF POLYOLEFINS

(71) Applicant: Basell Poliolefine Italia S.r.l., Milan (IT)

(72) Inventors: Lenka Richter-Lukesova, Hofheim (DE); Shahram Mihan, Bad Soden (DE); Sandor Nagy, Naperville, IL (US)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 14/651,878

(22) PCT Filed: Nov. 25, 2013

(86) PCT No.: PCT/EP2013/074560
§ 371 (c)(1),
(2) Date: Jun. 12, 2015

(87) PCT Pub. No.: WO2014/090554
PCT Pub. Date: Jun. 19, 2014

(65) Prior Publication Data
US 2015/0329657 A1    Nov. 19, 2015

Related U.S. Application Data

(60) Provisional application No. 61/737,709, filed on Dec. 14, 2012.

(30) Foreign Application Priority Data

Dec. 13, 2012 (EP) .................... 12196983

(51) Int. Cl.
| C08F 4/76 | (2006.01) |
| C08F 4/80 | (2006.01) |
| C08F 210/14 | (2006.01) |
| B01J 31/18 | (2006.01) |

(52) U.S. Cl.
CPC ............ *C08F 210/14* (2013.01); *B01J 31/181* (2013.01); *B01J 31/1815* (2013.01); *B01J 31/18* (2013.01); *B01J 2531/0238* (2013.01); *B01J 2531/0241* (2013.01); *B01J 2531/0258* (2013.01); *B01J 2531/48* (2013.01); *B01J 2531/842* (2013.01); *C08F 2410/04* (2013.01); *Y02P 20/52* (2015.11)

(58) Field of Classification Search
CPC ........ C08F 2410/04; C08F 4/80; C08F 4/76; B01J 2531/0238; B01J 2531/0244; B01J 2531/48; B01J 2531/842
See application file for complete search history.

(56) References Cited

U.S. PATENT DOCUMENTS

| 6,271,323 B1* | 8/2001 | Loveday | ................ | C08F 10/02 526/113 |
| 6,274,684 B1* | 8/2001 | Loveday | ................ | C08F 10/00 526/114 |
| 6,465,386 B1* | 10/2002 | Maddox | ................ | C08F 10/00 502/104 |
| 6,657,026 B1* | 12/2003 | Kimberley | ........... | C07D 213/53 502/113 |
| 7,148,175 B2* | 12/2006 | Citron | ..................... | C08F 10/00 502/117 |
| 7,999,043 B2* | 8/2011 | Mihan | ..................... | C08F 10/00 526/115 |
| 8,722,833 B2* | 5/2014 | Kipke | ..................... | C08F 10/00 502/102 |
| 2001/0031695 A1 | 10/2001 | Loveday et al. | | |
| 2011/0003948 A1 | 1/2011 | Mihan et al. | | |
| 2013/0274427 A1* | 10/2013 | Richter-Lukesova | .. | C08F 10/00 526/123.1 |

OTHER PUBLICATIONS

Wang Q, et al: "Polyethylene with bimodal molecular weight districubtion synthesized by 2, 6-bis (imino) pyridyl complexes of Fe (II) activated with various activators", European Polymer Journal, Pergamon Press Ltd. Oxford, GB, vol. 40, No. 8, Aug. 1, 2004, pp. 1881-1886, XP004517892, ISSN: 0014-3057.

(Continued)

*Primary Examiner* — Rip A Lee

(57) ABSTRACT

A catalyst system obtainable by contacting:
A) a metal complex of formula (I)

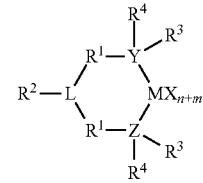

(I)

B) an iron complex of the general formula (II)

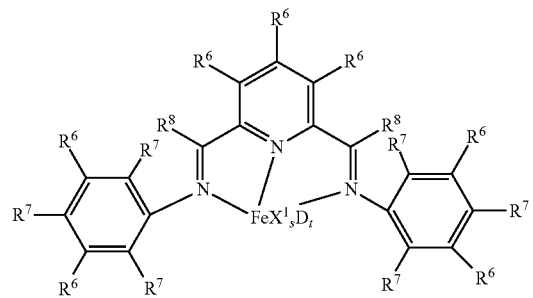

(II)

C) an alumoxane or a compound capable of forming an alkyl cation with complexes of formula (I) and (II);
Wherein the variables are described in the description.

14 Claims, No Drawings

(56) References Cited

OTHER PUBLICATIONS

Kumar K R et al: "Ethylene Polymerization Using Irion (II) Bis (Imino) Pyridyl and Nickel (Diimine) Catalysts: Effect of Cocatalysts and Reaction Parameters", Macromolecular Chemistry and Physics, Wiley-VCH Verlag, Weinheim, DE, vol. 201, No. 13, Jan. 1, 2000, pp. 1513-1520, XP001041272, ISSN: 1022-1352.
PCT International Search Report and the Written Opinion—Mailed Jan. 28, 2014 for Corresponding PCT/EP2013/074560.

* cited by examiner

CATALYST SYSTEM FOR THE PREPARATION OF POLYOLEFINS

FIELD OF THE INVENTION

The present invention relates to a catalyst systems comprising at least two organometallic compounds able to produce bimodal or multimodal polyolefin, in particular LLDPE (linear low density polyethylene).

BACKGROUND OF THE INVENTION

LLDPE-copolymers of ethylene with α-olefins, such as propene, 1-butene, 1-pentene, 1-hexene or 1-octene, can be prepared, for example, using classical Ziegler-Natta catalysts based on titanium or else by means of metallocenes.

WO2007/037836 A1 and WO2007/101053 A1 refer to hybrid catalyst systems using two different metallocene catalysts for the production of bimodal polyethylene. The inventions refer to metallocene-based catalyst system which can produce high molecular weight polyethylene with low levels of long chain branching and to other metallocene-based catalyst systems which are more responsive to hydrogen and produce low molecular weight polyethylene.

WO2007/012406 relates to a process for preparing a bimodal polyethylene polyethylene copolymer wherein the polymer comprises an high molecular weight component and a low molecular weight component. The polymerization is carried out in the presence of low amount of water or carbon dioxide. The low molecular weight component has a comonomer content of 0-1.5 mol %, while the higher molecular weight component has a comonomer content ranging from 0 to 15% by mol.

WO 2005/103095 relates to a polyethylene which comprises ethylene homopolymer and/or copolymer with alkenes obtained by using two single site catalyst component and having a distribution of molecular weigh comprised between 5 and 50. This document is silent about the amount of comonomer that can be present in the polymer.

WO2005/103096 relates to a polyethylene which comprises ethylene homopolymer and/or copolymer with alkenes obtained by using two single site catalyst component and having a distribution of molecular weigh comprised between 3 and 30.

SUMMARY OF THE INVENTION

The applicant found that it is possible to obtain a catalyst system able to give a multimodal LLDPE comprising a high molar mass component and a low molar mass component without using metallocene compounds that in order to be synthesized need multiple steps with low yields.

An object of the present invention is therefore a catalyst system obtainable by contacting:
A) at least one metal complex of formula (I)

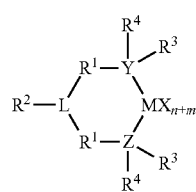

(I)

Wherein

M is a Group 3 to 12 transition metal or a Group 13 or 14 main group metal, preferably a Group 4, 5, or 6 metal, and more preferably a Group 4 metal, and most preferably zirconium, titanium or hafnium;

X, equal to or different from each other, is a halogen atom, a R, OR, SR, $NR_2$ or $PR_2$ group wherein R is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical; or two X groups can be joined together to form a divalent R' group wherein R' is a $C_1$-$C_{20}$-alkylidene, $C_6$-$C_{20}$-arylidene, $C_7$-$C_{20}$-alkylarylidene, or $C_7$-$C_{20}$-arylalkylidene divalent radical optionally containing heteroatoms belonging to groups 13-17 of the Periodic Table of the Elements; preferably X is a halogen atom or R group; more preferably X is a $C_7$-$C_{40}$-alkylaryl radical such as benzyl radical;

n is the oxidation state of M, preferably n is +3, +4, or +5, and more preferably n is +4;

m is the formal charge of the YLZ ligand, preferably m is 0, −1, −2 or −3, and more preferably m is −2;

L is an element of the Group 15 or 16 of the periodic table, preferably L is nitrogen;

Y is an element of the Group 15 of the periodic table, preferably Y is nitrogen or phosphorus, and more preferably Y is nitrogen;

Z is an element of the Group 15 of the periodic table, preferably Y is nitrogen or phosphorus, and more preferably Y is nitrogen;

$R^1$, equal to or different from each other, is a divalent $C_1$-$C_{40}$ hydrocarbon radical optionally containing heteroatoms belonging to groups 13-17 of the Periodic Table of the Elements or a divalent silylidene radical containing up to 5 silicon atom; preferably $R^1$ is a divalent bridging group selected from $C_1$-$C_{40}$ alkylidene, $C_3$-$C_{40}$ cycloalkylidene, $C_6$-$C_{40}$ arylidene, $C_7$-$C_{40}$ alkylarylidene, or $C_7$-$C_{40}$ arylalkylidene radicals optionally containing heteroatoms belonging to groups 13-17 of the Periodic Table of the Elements, and silylidene radical containing up to 5 silicon atoms; preferably $R^1$ is a group $(Z(R'')_2)_n$ wherein Z is a carbon or a silicon atom, n is 1 or 2 and R'' is an hydrogen atom or a $C_1$-$C_{10}$ hydrocarbon radical optionally containing heteroatoms belonging to groups 13-17 of the Periodic Table of the Elements; preferably R'' is a linear or branched, cyclic or acyclic, $C_1$-$C_1$-alkyl, $C_2$-$C_{10}$ alkenyl, $C_2$-$C_{10}$ alkynyl, $C_6$-$C_{10}$ aryl, $C_7$-$C_{10}$-alkylaryl or $C_7$-$C_{10}$-arylalkyl radical optionally containing heteroatoms belonging to groups 13-17 of the Periodic Table of the Elements; more preferably the group $(Z(R'')_2)_n$ is $CH_2$, $(CH_2)_2$, and $C(CH_3)_2$;

$R^2$ can be absent or it is a hydrogen atom or a $C_1$-$C_{40}$ hydrocarbon radical optionally containing heteroatoms belonging to groups 13-17 of the Periodic Table of the Elements; preferably $R^2$ is absent or is a hydrogen atom or a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; more preferably $R^2$ is absent or it is a hydrogen atom or a linear or branched, saturated or unsaturated $C_1$-$C_{10}$-alkyl radicals such as methyl or ethyl radicals;

$R^3$, equal to or different from each other, are $C_1$-$C_{40}$ hydrocarbon radicals optionally containing heteroatoms belonging to groups 13-17 of the Periodic Table of the Elements; preferably $R^3$ are linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; more preferably $R^3$ are $C_7$-$C_{20}$-alkylaryl or $C_7$-$C_{20}$-arylalkyl radicals;

$R^4$ equal to or different from each other can be absent or it is a hydrogen atom or a $C_1$-$C_{40}$ hydrocarbon radical optionally containing heteroatoms belonging to groups 13-17 of the Periodic Table of the Elements; preferably $R^4$ is absent or it is a hydrogen atom or a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; more preferably $R^4$ is absent or it is a hydrogen atom or a linear or branched, saturated or unsaturated $C_1$-$C_{10}$-alkyl radicals such as methyl or ethyl radicals;

B) at least one iron complex of the general formula (II)

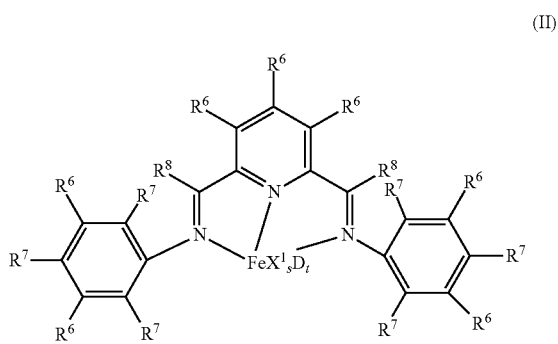

Wherein:
the radicals $X^1$, equal to or different from each other, are hydrogen atoms, halogen atoms, R, OR, $OSO_2CF_3$, OCOR, SR, $NR_2$ or $PR_2$ groups, wherein R is a linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl radical, optionally containing heteroatoms belonging to groups 13-17 of the Periodic Table of the Elements; or two $X^1$ can optionally form a substituted or unsubstituted butadienyl radical or a OR'O group wherein R' is a divalent radical selected from $C_1$-$C_{20}$ alkylidene, $C_6$-$C_{40}$ arylidene, $C_7$-$C_{40}$ alkylarylidene and $C_7$-$C_{40}$ arylalkylidene radicals; preferably $X^1$ is a hydrogen atom, a halogen atom or a R group; more preferably X is chlorine or a methyl radical;

D is an uncharged donor; s is 1, 2, 3 or 4, preferably s is 2 or 3; t ranges from 0 to 4, preferably t is 0, 1 or 2.

$R^6$, equal to or different from each other, are hydrogen atoms or $C_1$-$C_{40}$ hydrocarbon radicals optionally containing heteroatoms belonging to groups 13-17 of the Periodic Table of the Elements; preferably $R^6$ are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals optionally containing heteroatoms belonging to groups 13-17 of the Periodic Table of the Elements; more preferably $R^6$ are hydrogen atoms or $C_1$-$C_{10}$-alkyl radicals;

$R^7$, equal to or different from each other, are hydrogen atoms or $C_1$-$C_{40}$ hydrocarbon radicals optionally containing heteroatoms belonging to groups 13-17 of the Periodic Table of the Elements; preferably $R^7$ are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals optionally containing heteroatoms belonging to groups 13-17 of the Periodic Table of the Elements; more preferably $R^7$ are $C_1$-$C_{10}$-alkyl radicals such as methyl or isopropyl radicals;

$R^8$, equal to or different from each other, are hydrogen atoms or $C_1$-$C_{40}$ hydrocarbon radicals optionally containing heteroatoms belonging to groups 13-17 of the Periodic Table of the Elements; preferably $R^8$ are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals optionally containing heteroatoms belonging to groups 13-17 of the Periodic Table of the Elements; more preferably $R^8$ are $C_1$-$C_{10}$-alkyl radicals such as methyl or ethyl;

an alumoxane or a compound capable of forming an alkyl cation with complexes of formula (I) and (II);

DETAILED DESCRIPTION OF THE INVENTION

The ratio between the compound of formula A) and B) depends from the wished product to be obtained. As a general rule the molar ratio between the compound of formula (I) and the iron complex of formula (II) (M/Fe ratio) ranges from 3:1 to 50:1; preferably from 9:1 to 30:1; more preferably from 12:1 to 20:1.

Preferably $R^3$ is a moiety of formula (III):

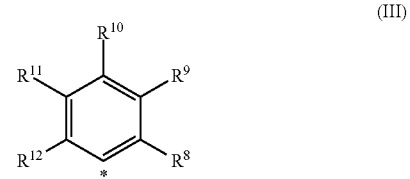

Wherein the symbol * represent the point in which the moiety of formula (III) is bound.

$R^8$, $R^9$, $R^{10}$, $R^{11}$ and $R^{12}$ are hydrogen atoms or, $C_1$-$C_{20}$ hydrocarbon radicals optionally containing heteroatoms belonging to groups 13-17 of the Periodic Table of the Elements; preferably $R^8$, $R^9$, $R^{10}$, $R^{11}$ and $R^{12}$ are hydrogen atoms or linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radicals optionally containing heteroatoms belonging to groups 13-17 of the Periodic Table of the Elements; more preferably $R^9$ and $R^{11}$ are hydrogen atoms and $R^8$, $R^{10}$ and $R^{12}$ are $C_1$-$C_{10}$-alkyl radicals such as methyl, ethyl or isopropyl radicals.

The alumoxanes used in the catalyst system according to the invention are considered to be linear, branched or cyclic compounds containing at least one group of the type:

wherein the substituents U, same or different, are defined above.

In particular, alumoxanes of the formula:

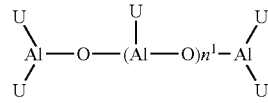

can be used in the case of linear compounds, wherein $n^1$ is 0 or an integer of from 1 to 40 and the substituents U are defined as above; or alumoxanes of the formula:

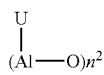

can be used in the case of cyclic compounds, wherein $n^2$ is an integer from 2 to 40 and the U substituents are defined as above.

Examples of alumoxanes suitable for use according to the present invention are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO).

Particularly interesting cocatalysts are those described in WO 99/21899 and in WO01/21674 in which the alkyl and aryl groups have specific branched patterns.

Non-limiting examples of aluminium compounds that can be reacted with water to give suitable alumoxanes (b), described in WO 99/21899 and WO01/21674, are: tris(2,3,3-trimethyl-butyl)aluminium, tris(2,3-dimethyl-hexyl)aluminium, tris(2,3-dimethyl-butyl)aluminium, tris(2,3-dimethyl-pentyl)aluminium, tris(2,3-dimethyl-heptyl)aluminium, tris(2-methyl-3-ethyl-pentyl)aluminium, tris(2-methyl-3-ethyl-hexyl)aluminium, tris(2-methyl-3-ethyl-heptyl)aluminium, tris(2-methyl-3-propyl-hexyl)aluminium, tris(2-ethyl-3-methyl-butyl)aluminium, tris(2-ethyl-3-methyl-pentyl)aluminium, tris(2,3-diethyl-pentyl)aluminium, tris(2-propyl-3-methyl-butyl)aluminium, tris(2-isopropyl-3-methyl-butyl)aluminium, tris(2-isobutyl-3-methyl-pentyl)aluminium, tris(2,3,3-trimethyl-pentyl)aluminium, tris(2,3,3-trimethyl-hexyl)aluminium, tris(2-ethyl-3,3-dimethyl-butyl)aluminium, tris(2-ethyl-3,3-dimethyl-pentyl)aluminium, tris(2-isopropyl-3,3-dimethyl-butyl)aluminium, tris(2-trimethylsilyl-propyl)aluminium, tris(2-methyl-3-phenyl-butyl)aluminium, tris(2-ethyl-3-phenyl-butyl)aluminium, tris(2,3-dimethyl-3-phenyl-butyl)aluminium, tris(2-phenyl-propyl)aluminium, tris[2-(4-fluorophenyl)-propyl]aluminium, tris[2-(4-chloro-phenyl)-propyl]aluminium, tris[2-(3-isopropyl-phenyl)-propyl]aluminium, tris(2-phenyl-butyl)aluminium, tris(3-methyl-2-phenyl-butyl)aluminium, tris(2-phenyl-pentyl)aluminium, tris[2-(pentafluorophenyl)-propyl]aluminium, tris[2,2-diphenyl-ethyl]aluminium and tris[2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group.

Amongst the above aluminium compounds, trimethylaluminium (TMA), triisobutylaluminium (TIBA), tris(2,4,4-trimethyl-pentyl)aluminium (TIOA), tris(2,3-dimethylbutyl)aluminium (TDMBA) and tris(2,3,3-trimethylbutyl)aluminium (TTMBA) are preferred.

Non-limiting examples of compounds able to form an alkylmetallocene cation are compounds of formula $D^+E^-$, wherein $D^+$ is a Brønsted acid, able to donate a proton and to react irreversibly with a substituent X of the metallocene of formula (I) and $E^-$ is a compatible anion, which is able to stabilize the active catalytic species originating from the reaction of the two compounds, and which is sufficiently labile to be removed by an olefinic monomer. Preferably, the anion $E^-$ comprises one or more boron atoms. More preferably, the anion $E^-$ is an anion of the formula $BAr_4^{(-)}$, wherein the substituents Ar which can be identical or different are aryl radicals such as phenyl, pentafluorophenyl or bis(trifluoromethyl)phenyl. Tetrakis-pentafluorophenyl borate is particularly preferred compound, as described in WO 91/02012. Moreover, compounds of formula $BAr_3$ can be conveniently used. Compounds of this type are described, for example, in the International patent application WO 92/00333. Other examples of compounds able to form an alkylmetallocene cation are compounds of formula $BAr_3P$ wherein P is a substituted or unsubstituted pyrrol radical. These compounds are described in WO01/62764. Compounds containing boron atoms can be conveniently supported according to the description of DE-A-19962814 and DE-A-19962910. All these compounds containing boron atoms can be used in a molar ratio between boron and the metal of the metallocene comprised between about 1:1 and about 10:1; preferably 1:1 and 2.1; more preferably about 1:1.

Non limiting examples of compounds of formula $D^+E^-$ are:
Tributylammoniumtetra(pentafluorophenyl)aluminate,
Tributylammoniumtetra(trifluoromethylphenyl)borate,
Tributylammoniumtetra(4-fluorophenyl)borate,
N,N-Dimethylbenzylammonium-tetrakispentafluorophenylborate,
N,N-Dimethylhexylamonium-tetrakispentafluorophenylborate,
N,N-Dimethylaniliniumtetrakis(pentafluorophenyl)borate,
N,N-Dimethylaniliniumtetrakis(pentafluorophenyl)aluminate,
N,N-Dimethylbenzylammonium-tetrakispentafluorophenylborate,
N,N-Dimethylhexylamonium-tetrakispentafluorophenylborate,
Di(propyl)ammoniumtetrakis(pentafluorophenyl)borate,
Di(cyclohexyl)ammoniumtetrakis(pentafluorophenyl)borate,
Triphenylcarbeniumtetrakis(pentafluorophenyl)borate,
Triphenylcarbeniumtetrakis(pentafluorophenyl)aluminate,
Ferroceniumtetrakis(pentafluorophenyl)borate,
Ferroceniumtetrakis(pentafluorophenyl)aluminate.
Triphenylcarbeniumtetrakis(pentafluorophenyl)borate, and
N,N-Dimethylaniliniumtetrakis(pentafluorophenyl)borate.

The catalysts system to be used in the process of the present invention can be supported on an inert carrier. This is achieved by depositing metal complex A) and the iron complex B) or the product of the reaction thereof with the component C), or the component C) and then metal complex A) and the iron complex B) on an inert support. The support can be a porous solid such as talc, a sheet silicate, an inorganic oxide or a finely divided polymer powder (e.g. polyolefin). Suitable inorganic oxides may be found among the oxides of elements of groups 2, 3, 4, 5, 13, 14, 15 and 16 of the Periodic Table of the Elements. Examples of oxides preferred as supports include silicon dioxide, aluminum oxide, and also mixed oxides of the elements calcium, aluminum, silicon, magnesium or titanium and also corresponding oxide mixtures, magnesium halides, styrene/divinylbenzene copolymers, polyethylene or polypropylene. Other inorganic oxides which can be used alone or in combination with the abovementioned preferred oxidic supports are, for example, MgO, $ZrO_2$, $TiO_2$ or $B_2O_3$.

A suitable class of supports which can be used is that constituted by porous organic supports functionalized with groups having active hydrogen atoms. Particularly suitable are those in which the organic support is a partially crosslinked styrene polymer. Supports of this type are described in European application EP-633 272.

Another class of inert supports particularly suitable for use according to the invention is that of polyolefin porous prepolymers, particularly polyethylene.

The support materials used preferably have a specific surface area in the range from 10 to 1000 m$^2$/g, a pore volume in the range from 0.1 to 5 ml/g and a mean particle size of from 1 to 500 µm. Preference is given to supports having a specific surface area in the range from 50 to 500 m$^2$/g, a pore volume in the range from 0.5 to 3.5 ml/g and a mean particle size in the range from 5 to 350 µm. Particular preference is given to supports having a specific surface area in the range from 200 to 400 m$^2$/g, a pore volume in the range from 0.8 to 3.0 ml/g and a mean particle size of from 10 to 300 µm.

The inorganic support can be subjected to a thermal treatment, e.g. to remove adsorbed water. Such a drying treatment is generally carried out at from 80 to 300° C., preferably from 100 to 200° C., with drying at from 100 to 200° C. preferably being carried out under reduced pressure and/or a blanket of inert gas (e.g. nitrogen), or the inorganic support can be calcined at from 200 to 1 000° C. to produce the desired structure of the solid and/or set the desired OH concentration on the surface. The support can also be treated chemically using customary desiccants such as metal alkyls, preferably aluminum alkyls, chlorosilanes or SiCl$_4$, or else methylaluminoxane. Appropriate treatment methods are described, for example, in WO 00/31090.

The inorganic support material can also be chemically modified. For example, treatment of silica gel with (NH$_4$)$_2$SiF$_6$ leads to fluorination of the silica gel surface, or treatment of silica gels with silanes containing nitrogen-, fluorine- or sulfur-containing groups leads to correspondingly modified silica gel surfaces.

Organic support materials such as finely divided polyolefin powders (e.g. polyethylene, polypropylene or polystyrene) can also be used and are preferably likewise freed of adhering moisture, solvent residues or other impurities by means of appropriate purification and drying operations before use. It is also possible to use functionalized polymer supports, e.g. supports based on polystyrene, via whose functional groups, for example ammonium or hydroxy groups, at least one of the catalyst components can be immobilized. The solid compound obtained by supporting the catalyst system object of the present invention on a carrier in combination with the further addition of the alkylaluminium compound either as such or prereacted with water if necessary, can be usefully.

Preferred support is silica.

With the catalyst system of the present invention it is possible to polymerize alpha-olefins in high yield to obtain polymers having high molecular weight. Thus a further object of the present invention is a process for polymerizing one or more alpha olefins of formula CH$_2$=CHT wherein T is hydrogen or a C$_1$-C$_{20}$ alkyl radical comprising the step of contacting said alpha-olefins of formula CH$_2$=CHT under polymerization conditions in the presence of the catalyst system described above.

Preferred alpha-olefins are ethylene, propylene, 1-butene, 1-hexene, 1-octene.

The catalyst system of the present invention is particularly fit for polymerizing ethylene with alkenes of formula CH$_2$=CHT$^1$ wherein T$^1$ is a C$_1$-C$_{20}$ alkyl radical. The obtained multimodal ethylene copolymer is endowed with a very broad molecular weight distribution and it shows at least two peaks at the GPC analysis.

The total comonomer content of the multimodal copolymer ranges from 3% to 30% by weight.

Thus a further object of the present invention is a process for copolymerizing ethylene and at least one comonomer of formula CH$_2$=CHT$^1$ wherein T' is a C$_1$-C$_{20}$ alkyl radical comprising the step of contacting said alpha-olefins of formula CH$_2$=CHT under polymerization conditions in the presence of the catalyst system described above.

The polymerization process can be carried out using all industrially known polymerization methods at temperatures in the range from −60 to 350° C., preferably from 0 to 200° C. and particularly preferably from 25 to 150° C., and under pressures of from 0.5 to 4000 bar, preferably from 1 to 100 bar and particularly preferably from 3 to 40 bar. The polymerization can be carried out in a known manner in bulk, in suspension, in the gas phase or in a supercritical medium in the customary reactors used for the polymerization of olefins. It can be carried out batchwise or preferably continuously in one or more stages. High-pressure polymerization processes in tube reactors or autoclaves, solution processes, suspension processes, stirred gas-phase processes and gas-phase fluidized-bed processes are all possible.

The polymerizations are usually carried out at temperatures in the range from −60 to 350° C., preferably in the range from 20 to 300° C., and under pressures of from 0.5 to 4000 bar. The mean residence times are usually from 0.5 to 5 hours, preferably from 0.5 to 3 hours. The advantageous pressure and temperature ranges for carrying out the polymerizations usually depend on the polymerization method. In the case of high-pressure polymerization processes, which are customarily carried out at pressures of from 1000 to 4000 bar, in particular from 2000 to 3500 bar, high polymerization temperatures are generally also set. Advantageous temperature ranges for these high-pressure polymerization processes are from 200 to 320° C., in particular from 220 to 290° C. In the case of low-pressure polymerization processes, it is usual to set a temperature which is at least a few degrees below the softening temperature of the polymer. In particular, temperatures of from 50 to 180° C., preferably from 70 to 120° C., are set in these polymerization processes. In the case of suspension polymerizations, the polymerization is usually carried out in a suspension medium, preferably an inert hydrocarbon such as isobutane or mixtures of hydrocarbons or else in the monomers themselves. The polymerization temperatures are generally in the range from −20 to 115° C., and the pressure is generally in the range from 1 to 100 bar. The solids content of the suspension is generally in the range from 10 to 80%. The polymerization can be carried out either batchwise, e.g. in stirring autoclaves, or continuously, e.g. in tube reactors, preferably in loop reactors. Particular preference is given to employing the Phillips PF process as described in U.S. Pat. No. 3,242,150 and U.S. Pat. No. 3,248,179. The gas-phase polymerization is generally carried out in the range from 30 to 125° C. at pressures of from 1 to 50 bar.

Among the abovementioned polymerization processes, particular preference is given to gas-phase polymerization, in particular in gas-phase fluidized-bed reactors, solution polymerization and suspension polymerization, in particular in loop reactors and stirred tank reactors. The gas-phase polymerization can also be carried out in the condensed or supercondensed mode, in which part of the circulating gas is cooled to below the dew point and is recirculated as a two-phase mixture to the reactor. Furthermore, it is possible to use a multizone reactor in which the two polymerization zones are linked to one another and the polymer is passed alternately through these two zones a number of times. The two zones can also have different polymerization conditions. Such a reactor is described, for example, in WO 97/04015. The different or identical polymerization processes can also, if desired, be connected in series so as to form a polymerization cascade, for example as in the Hostalen® process. A parallel reactor arrangement using two or more identical or different processes is also possible. Furthermore, molar mass regulators, for example hydrogen, or customary additives such as antistatics can also be used in the polymerizations. Hydrogen can especially be used to enhance the activity of the hafnocene (A). The hydrogen and increased temperature usually lead to lower z-average molar mass.

The polymerization is preferably carried out in a single reactor, in particular in a gas-phase reactor. The polymerization of ethylene with alkenes having from 3 to 10 carbon atoms gives the polyethylene of the invention when the catalyst of the invention is used. The polyethylene powder obtained directly from the reactor displays a very high homogeneity, so that, unlike the case of cascade processes, subsequent extrusion is not necessary in order to obtain a homogeneous product.

The production of polymer blends by intimate mixing of individual components, for example by melt extrusion in an extruder or kneader (cf., for example, "Polymer Blends" in Ullmann's Encyclopedia of Industrial Chemistry, 6$^{th}$ Edition, 1998, Electronic Release), is often accompanied by particular difficulties. The melt viscosities of the high and low molecular weight components of a bimodal polyethylene blend are extremely different. While the low molecular weight component is quite fluid at the customary temperatures of about 190-210 C used for producing the blends, the high molecular weight component is only softened ("lentil soup"). Homogeneous mixing of the two components is therefore for very difficult. In addition, it is known that the high molecular weight component can easily be damaged as a result of thermal stress and by shear forces in the extruder, so that the properties of the blend are adversely affected. The mixing quality of such polyethylene blends is therefore often unsatisfactory.

The preparation of the polyethylene of the invention in the reactor reduces the energy consumption, requires no subsequent blending processes and makes simple control of the molecular weight distributions and the molecular weight fractions of the various polymers possible. In addition, good mixing of the polyethylene is achieved.

The following examples are given for illustrative purposes and do not intend to limit the scope of the invention.

EXAMPLES

Determination of the Melting Point

The melting point $T_m$ was determined by means of a DSC measurement in accordance with ISO Standard 3146 in a first heating phase at a heating rate of 20° C. per minute to 200° C., a dynamic crystallization at a cooling rate of 20° C. per minute down to 25° C. and a second heating phase at a heating rate of 20° C. per minute back to 200° C. The melting point was then the temperature at which the curve of enthalpy versus temperature measured in the second heating phase displayed a maximum.

Gel Permeation Chromatography

Gel permeation chromatography (GPC) was carried out at 145° C. in 1,2,4-trichlorobenzene using a Waters 150C GPC apparatus. The evaluation of the data was carried out using the software Win-GPC from HS-Entwicklungsgesellschaft für wissenschaftliche Hard- und Software mbH, Ober-Hilbersheim. The columns were calibrated by means of polypropylene standards having molar masses ranging from 100 to $10^7$ g/mol. The mass average molar mass ($M_w$) and number average molar mass ($M_n$) of the polymers were determined. The Q value is the ratio of mass average molar mass ($M_w$) to number average molar mass ($M_n$).

Determination of the Viscosity Number (I.V.)

The viscosity number was determined in an Ubbelohde viscometer PVS 1 fitted with an S 5 measuring head (both from Lauda) in decalin at 135° C. To prepare the sample, 20 mg of polymer were dissolved in 20 ml of decalin at 135° C. for 2 hours. 15 ml of the solution were placed in the viscometer and the instrument carried out a minimum of three running-out time measurements until a consistent result had been obtained. The I.V. was calculated from the running-out times by means of the relationship I.V.=(t/t$_0$−1)*1/c, where t=mean of the running-out time of the solution, t$_0$=mean of the running-out time of the solvent, c: concentration of the solution in g/ml.

Density

The density [g/cm$^3$] was determined in accordance with ISO 1183.

Comonomern Content and Structure of the Polymer

Measured by IR

Catalyst Components

Component A)

Preparation of $\{[(2,4,6\text{-}Me_3C_6H_2)NCH_2CH_2]_2NH\}Zr(CH_2Ph)_2$ (Component A) [(2,4,6-Me3C6H2)NHCH2CH2]2NH

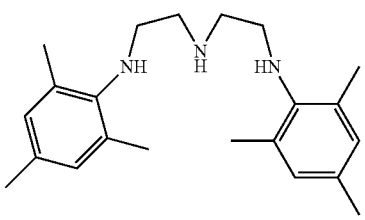

has been prepared according to example 1 of WO 02/50088.

(MesNHCH2CH2)2NH (195.9 mg, 578 µmol) was dissolved in Toluene (3 ml) and reacted with Zr(CH$_2$Ph)$_4$ (443 µmol) dissolved in Toluene (1 mL) for 15 min while stirring at room temperature. The Solution has been used as such.

Component B)

2,6-Bis[1-(2-Chlor-4,6-trimethylphenylimino)ethyl]pyridine was prepared as in example 1 of WO 98/27124 and reacted in an analogous manner with iron(II) chloride to give 2,6-2,6-Bis[1-(2-Chlor-4,6-trimethylphenylimino)ethyl] pyridine iron(II) dichloride, as likewise disclosed in WO98/27124.

Component C)

Methylalumoxane (MAO) was received from Albemarle as a 30% wt/wt toluene solution.

Preparation of the Catalyst Systems

MAO (7 ml, 4.75 mol/l) was added into the solution of component A) prepared as above described. In another flask component B) (22 mg, 39 μmol) was dissolved in MAO (2.2 ml, 4.75 mol/l) and added to the MAO solution of component A) and stirred for 15 min. The ready solution was added drop wise to XPO 2326 Silicagel (8.8 g calcinated at 600° C. 6 h) within 5 min at 10° C.

After that the powder was stirred for 1 h and allowed to reach at room temperature. 50 ml of n-heptane were added in two portions, while stirring continued for 1 min. The catalyst powder was dried for 1 h by continuously passing through a stream of Ar. 15 g of a ivory, free flowing powder were obtained.

Polymerization

The ethylene-hexene copolymerization was carried out in a 1 L jacketed steel autoclave, equipped with an anchor stirrer. Prior the experiment, the autoclave was dried at 65° C., charged with 3 bar Ar and the pressure released. This procedure was repeated for 2 times. The autoclave was charged with 150 mg TIBA (50 mg/ml in heptane) and 400 ml iso-butane at 70° C. The pressure was raised to 26 bar-g by charging the autoclave with 30 L of ethylene and 4 ml of 1-hexene. 77 mg of catalyst were injected and the stirrer set to 300 rpm. The polymeriziation continued for 1 h, while the pressure was maintained at 26 bar by feeding additional 35 NL of ethylene and 27.6 ml of 1-hexene. The polymerization was stopped by venting off all volatiles and applying vacuum for 30 min. 46 g of polymer were obtained corresponding to an activity of 597 g/gh. The polymer was dried and analyzed, the results of the analysis has been reported in table 1.

TABLE 1

| | | |
|---|---|---|
| viscosity number | dl/g | 2.89 |
| Mw | | 761531 |
| Mn | | 12953 |
| Mz | | 9398033 |
| Mw/Mn | | 57.8 |
| Density | g/cm$^3$ | 0.9501 |
| 1-hexene content | % wt | 1.3 |
| Melting point | ° C. | 132.8 |
| CH3 | 1/1000 Carbon atom | 3.5 |
| Trans double bond | 1/1000 Carbon atom | 0.01 |
| Vinyl double bond | 1/1000 Carbon atom | 1.07 |
| Vinyliden double bond | 1/1000 Carbon atom | 0.12 |

The GPC of the polymer shows two well differentiated peaks that is together with the very broad molecular weight the evidence of the bimodality of the polymer obtained.

What is claimed is:

1. A catalyst system obtained by contacting:
A) at least one metal complex of formula (I):

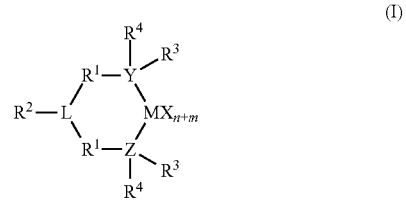

(I)

wherein
M is a Group 3 to 12 transition metal or a Group 13 or 14 main group metal,
X, equal to or different from each other, is a halogen atom, a R, OR, SR, NR$_2$ or PR$_2$ group,
(i) wherein R is a linear or branched, cyclic or acyclic, $C_1$-$C_{40}$ alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical; or two X groups can be joined together to form a divalent R' group,
(ii) wherein R' is a $C_1$-$C_{20}$-alkylidene, $C_6$-$C_{20}$-arylidene, $C_7$-$C_{20}$-alkylarylidene, or $C_7$-$C_{20}$-arylalkylidene divalent radical optionally containing heteroatoms belonging to Groups 13-17 of the Periodic Table of the Elements;
n is the oxidation state of M;
m is the formal charge of the YLZ ligand;
L is an element of the Group 15 or 16 of the Periodic Table of the Elements;
Y is an element of the Group 15 of the Periodic Table of the Elements;
Z is an element of the Group 15 of the Periodic Table of the Elements;
R$^1$, equal to or different from each other, is a divalent $C_1$-$C_{40}$ hydrocarbon radical optionally containing heteroatoms belonging to Groups 13-17 of the Periodic Table of the Elements or a divalent silylidene radical containing up to 5 silicon atoms;
R$^2$ is absent or it is a hydrogen atom or a $C_1$-$C_{40}$ hydrocarbon radical optionally containing heteroatoms belonging to Groups 13-17 of the Periodic Table of the Elements;
R$^3$, equal to or different from each other, are $C_1$-$C_{40}$ hydrocarbon radicals optionally containing heteroatoms belonging to Groups 13-17 of the Periodic Table of the Elements;
R$^4$ equal to or different from each other is absent or it is a hydrogen atom or a $C_1$-$C_{40}$ hydrocarbon radical optionally containing heteroatoms belonging to Groups 13-17 of the Periodic Table of the Elements;
B) at least one iron complex of the general formula (II)

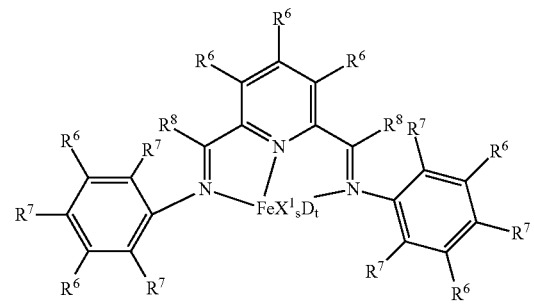

(II)

wherein
the radicals $X^1$, equal to or different from each other, are hydrogen atoms, halogen atoms, R, OR, $OSO_2CF_3$, OCOR, SR, $NR_2$ or $PR_2$ groups, wherein R is a linear or branched, saturated or unsaturated $C_1$-$C_{20}$ alkyl, $C_3$-$C_{20}$ cycloalkyl, $C_6$-$C_{20}$ aryl, $C_7$-$C.sub.20$ alkylaryl or $C_7$-$C_{20}$ arylalkyl radical, optionally containing heteroatoms belonging to Groups 13-17 of the Periodic Table of the Elements; or two $X^1$ can optionally form a substituted or unsubstituted butadienyl radical or a OR'O group wherein R' is a divalent radical selected from $C_1$-$C_{20}$ alkylidene, $C_6$-$C_{40}$ arylidene, $C_7$-$C_{40}$ alkylarylidene and $C_7$-$C_{40}$ arylalkylidene radicals;

D is an uncharged donor; s is 1, 2, 3 or 4; t ranges from 0 to 4;

$R^6$, equal to or different from each other, are hydrogen atoms or $C_1$-$C_{40}$ hydrocarbon radicals optionally containing heteroatoms belonging to Groups 13-17 of the Periodic Table of the Elements;

$R^7$, equal to or different from each other, are halogen atoms, hydrogen atoms or $C_1$-$C_{40}$ hydrocarbon radicals optionally containing heteroatoms belonging to Groups 13-17 of the Periodic Table of the Elements;

$R^8$, equal to or different from each other, are hydrogen atoms or $C_1$-$C_{40}$ hydrocarbon radicals optionally containing heteroatoms belonging to Groups 13-17 of the Periodic Table of the Elements;

C) an alumoxane or a compound that forms an alkyl cation with complexes of formula (I) and (II).

2. The catalyst system according to claim h wherein in the compound of formula (I):
M is zirconium, titanium or hafnium;
X is a $C_7$-$C_{40}$-alkylaryl radical;
n is +4;
m is −2;
L is nitrogen;
Y is nitrogen or phosphorous;
$R^1$ is a group $(Z(R'')_2)_n$ wherein Z is a carbon or a silicon atom, n is 1 or 2 and R" is an hydrogen atom or a $C_1$-$C_{10}$ hydrocarbon radical;
$R^2$ is a hydrogen atom or a linear or branched, saturated or unsaturated $C_1$-$C_{10}$-alkyl radicals;
$R^3$ are $C_7$-$C_{20}$-alkylaryl or $C_7$-$C_{20}$-arylalkyl radicals;
$R^4$ is absent.

3. The catalyst system according to claim h wherein in the compound of formula (II):
$X^1$ is a hydrogen atom,
a halogen atom or a R group wherein R is defined as a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical; or two X groups can be joined together to form a divalent R' group;
s is 2 or 3;
t is 0, 1 or 2;
$R^6$ are hydrogen atoms or $C_1$-$C_{10}$ alkyl radicals;

$R^7$ are $C_1$-$C_{10}$-alkyl radicals;
$R^8$ are $C_1$-$C_{10}$-alkyl radicals.

4. The catalyst system according to claim 1, wherein $R^3$ is a moiety of formula (III):

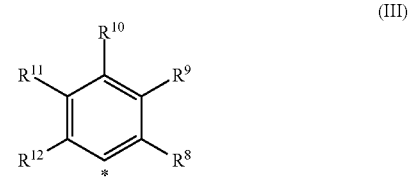

wherein
the symbol * represents the point in which the moiety of formula (III) is bound to Y or Z;
$R^8$, $R^9$, $R^{10}$, $R^{11}$ and $R^{12}$ are hydrogen atoms or, $C_1$-$C_{20}$ hydrocarbon radicals optionally containing heteroatoms belonging to groups 13-17 of the Periodic Table of the Elements.

5. The catalyst system according to claim 4, wherein in the moiety of formula (III):
$R^9$ and $R^{11}$ are hydrogen atoms and
$R^8$, $R^{10}$ and $R^{12}$ are $C_1$-$C_{10}$-alkyl radicals.

6. The catalyst system according to claim 1, further comprising an inert carrier.

7. The catalyst system according to claim 6, wherein the inert carrier is silica.

8. A process for polymerizing one or more alpha olefins of formula $CH_2$=CHT wherein T is hydrogen or a $C_1$-$C_{20}$ alkyl radical comprising the step of contacting said alpha-olefins of formula $CH_2$=CHT under polymerization conditions in the presence of the catalyst system of claim 1.

9. The process according to claim 8, comprising copolymerizing ethylene and at least one comonomer of formula $CH_2$=$CHT^1$ wherein $T^1$ is a $C_1$-$C_{20}$ alkyl radical.

10. The catalyst system of claim 1, wherein A {[(2,4,6-$Me_3C_6H_2$)$NHCH_2CH_2$)$_2$NH}Zr($CH_2$Ph)$_2$ and/or B is 2,6-bis[1-(2-chlor-4,6-trimethylphenylimino)ethyl]pyridine iron (II) dichloride.

11. A composition comprising a polyolefin and the catalyst system of claim 1.

12. The composition of claim 11, wherein said polyolefin is polyethylene.

13. The composition of claim 11, wherein A {[(2,4,6-$Me_3C_6H_2$)$NHCH_2CH_2$)$_2$NH}Zr($CH_2$Ph)$_2$ and/or B is 2,6-bis[1-(2-chlor-4,6-trimethylphenylimino)ethyl]pyridine iron (II) dichloride.

14. The composition of claim 11, wherein the polyolefin is the product of the (co)polymerization of one or more alpha olefins of formula $CH_2$=CHT wherein T is hydrogen or a $C_1$-$C_{20}$ alkyl radical with said catalyst system.

* * * * *

UNITED STATES PATENT AND TRADEMARK OFFICE
CERTIFICATE OF CORRECTION

PATENT NO. : 9,458,271 B2
APPLICATION NO. : 14/651878
DATED : October 4, 2016
INVENTOR(S) : Lenka Richter-Lukesova et al.

It is certified that error appears in the above-identified patent and that said Letters Patent is hereby corrected as shown below:

On the Title Page

| | | |
|---|---|---|
| Column 1, (30) | Line 1 | Delete "12196983" and insert --12196983.6-- |
| Column 2, Other Publications | Line 2 | Delete "districubtion" and insert --distribution-- |
| Column 2, Other Publications | Line 2 | Delete "2, 6-bis (imino) pyridyl" and insert --2,6-bis(imino)pyridyl-- |
| Column 2, (57) | Line 2 | After "(I)", insert --:-- |
| Column 2, (57) | Line 4 | After "(II)", insert --:-- |
| Column 2, (57) | Line 8 | Delete "Wherein" and insert --wherein-- |
| Page 2, Column 1, Other Publications | Line 1 | Delete "Irion" and insert --Iron-- |

In the Specification

| | | |
|---|---|---|
| Column 1 | Line 2 | After "POLYOLEFINS", insert --This application is the U.S. National Phase of PCT International Application PCT/EP2013/074560, filed Nov. 25, 2013, claiming benefit of priority to European Patent Application No. 12196983.6, filed Dec. 13, 2012, and benefit of priority under 35 U.S.C. § 119(e) of U.S. Provisional Application No. 61/737,709 filed Dec. 14, 2012, the contents of which are incorporated herein by reference in their entirety.-- |
| Column 1 | Line 37 | Delete "weigh" and insert --weight-- |
| Column 1 | Line 43 | Delete "weigh" and insert --weight-- |
| Column 1 | Line 55 | After "(I)", insert --:-- |
| Column 2 | Line 1 | Delete "Wherein" and insert --wherein:-- |
| Column 3 | Line 3 | After "R$^4$", insert --,-- |
| Column 3 | Line 15 | After "(II)", insert --:-- |
| Column 3 | Line 32 | Delete "Wherein:" and insert --wherein:-- |

Signed and Sealed this
Fifteenth Day of January, 2019

Andrei Iancu
*Director of the United States Patent and Trademark Office*

CERTIFICATE OF CORRECTION (continued)
U.S. Pat. No. 9,458,271 B2

| | | |
|---|---|---|
| Column 3 | Line 47 | Delete "2." and insert --2;-- |
| Column 4 | Line 12 | Delete "(II);" and insert --(II).-- |
| Column 4 | Line 36 | Delete "Wherein" and insert --wherein-- |
| Column 6 | Line 27 | Delete "N,N-Dimethylhexylamonium-tetrakispentafluorophenylborate," and insert --N,N-Dimethylhexylammonium-tetrakispentafluorophenylborate,-- |
| Column 6 | Line 34 | Delete "N,N-Dimethylhexylamonium-tetrakispentafluorophenylborate," and insert --N,N-Dimethylhexylammonium-tetrakispentafluorophenylborate,-- |
| Column 6 | Line 42 | Delete "Ferroceniumtetrakis(pentafluorophenyl)aluminate." and insert --Ferroceniumtetrakis(pentafluorophenyl)aluminate,-- |
| Column 7 | Line 19 | Delete "80 to 300° C.," and insert --80 °C. to 300 °C.,-- |
| Column 7 | Line 20 | Delete "100 to 200° C.," and insert --100 °C. to 200 °C.,-- |
| Column 7 | Line 20 | Delete "100 to 200° C." and insert --100 °C. to 200 °C.-- |
| Column 7 | Line 23 | Delete "200 to 1 000° C." and insert --200 °C. to 1000 °C.-- |
| Column 7 | Line 55 | Delete "alpha olefins" and insert --alpha-olefins-- |
| Column 8 | Line 5 | Delete "T'" and insert --$T^1$-- |
| Column 8 | Line 11 | Delete "-60 to 350° C.," and insert -- -60 °C. to 350 °C.,-- |
| Column 8 | Line 11 | Delete "0 to 200° C." and insert --0 °C. to 200 °C.-- |
| Column 8 | Line 12 | Delete "25 to 150° C.," and insert --25 °C. to 150 °C.,-- |
| Column 8 | Line 24 | Delete "-60 to 350° C.," and insert -- -60 °C. to 350 °C.,-- |
| Column 8 | Line 25 | Delete "20 to 300° C.," and insert --20 °C. to 300 °C.,-- |
| Column 8 | Line 35 | Delete "200 to 320° C.," and insert --200 °C. to 320 °C.,-- |
| Column 8 | Line 35 | Delete "220 to 290° C." and insert --220 °C. to 290 °C.-- |
| Column 8 | Line 39 | Delete "50 to 180° C.," and insert --50 °C. to 180 °C.,-- |
| Column 8 | Line 39 | Delete "70 to 120° C.," and insert --70 °C. to 120 °C.,-- |
| Column 8 | Line 45 | Delete "-20 to 115° C.," and insert -- -20 °C. to 115 °C.,-- |
| Column 8 | Line 54 | Delete "30 to 125° C." and insert --30 °C. to 125 °C.-- |
| Column 9 | Line 31 | Delete "190-210 C." and insert --190 °C.-210 °C.-- |
| Column 10 | Line 40 | Delete "[(2,4,6-Me3C6H2)NHCH2CH2]2NH" and insert --[(2,4,6-Me$_3$C$_6$H$_2$)NHCH$_2$CH$_2$]$_2$NH-- |
| Column 10 | Line 55 | Delete "(MesNHCH2CH2)2NH" and insert --(MesNHCH$_2$CH$_2$)$_2$NH-- |
| Column 10 | Line 62 | Delete "2,6-Bis[1-(2-Chlor-4,6-trimethylphenylimino)ethyl]pyridine" and insert --2,6-bis[1-(2-chlor-4,6-trimethylphenylimino)ethyl]pyridine-- |
| Column 10 | Line 65 | Delete "2,6-2,6-Bis[1-(2-Chlor-4,6-trimethylphenylimino)ethyl]pyridine" and insert --2,6-2,6-bis[1-(2-chlor-4,6-trimethylphenylimino)ethyl]pyridine-- |
| Column 11 | Table 1 | Delete "Mw" and insert --$M_w$-- |
| Column 11 | Table 1 | Delete "Mn" and insert --$M_n$-- |
| Column 11 | Table 1 | Delete "Mz" and insert --$M_z$-- |

CERTIFICATE OF CORRECTION (continued)
U.S. Pat. No. 9,458,271 B2

| | | |
|---|---|---|
| Column 11 | Table 1 | Delete "Mw/Mn" and insert --$M_w/M_n$-- |
| Column 11 | Table 1 | Delete "CH3" and insert --$CH_3$-- |

In the Claims

| | | |
|---|---|---|
| Column 12 | Line 14 | In Claim 1, after "wherein", insert --:-- |
| Column 12 | Line 20 | In Claim 1, delete "$C_1$-$C_{40}$ alkyl," and insert --$C_1$-$C_{40}$-alkyl,-- |
| Column 12 | Line 48 | In Claim 1, after "$R^4$", insert --,-- |
| Column 12 | Line 52 | In Claim 1, after "(II)", insert --:-- |
| Column 13 | Line 1 | In Claim 1, after "wherein", insert --:-- |
| Column 13 | Line 6 | In Claim 1, delete "$C_7$-C.sub.20 alkylaryl" and insert --$C_7$-$C_{20}$ alkylaryl-- |
| Column 13 | Line 31 | In Claim 2, delete "claim h" and insert --claim 1,-- |
| Column 13 | Line 46 | In Claim 3, delete "claim h" and insert --claim 1,-- |
| Column 14 | Line 16 | In Claim 4, after "wherein", insert --:-- |
| Column 14 | Line 25 | In Claim 5, after "atoms", insert --;-- |
| Column 14 | Line 31 | In Claim 8, delete "alpha olefins" and insert --alpha-olefins-- |
| Column 14 | Line 32 | In Claim 8, after "$CH_2$=CHT", insert --,-- |
| Column 14 | Line 39 | In Claim 10, delete "{[(2,4,6-$Me_3C_6H_2$)$NHCH_2CH_2$)$_2$NH}Zr($CH_2Ph$)$_2$" and insert --{[(2,4,6-$Me_3C_6H_2$)$NHCH_2CH_2$]$_2$NH}Zr($CH_2Ph$)$_2$-- |
| Column 14 | Line 47 | In Claim 13, delete "{[(2,4,6-$Me_3C_6H_2$)$NHCH_2CH_2$)$_2$NH}Zr($CH_2Ph$)$_2$" and insert --{[(2,4,6-$Me_3C_6H_2$)$NHCH_2CH_2$]$_2$NH}Zr($CH_2Ph$)$_2$-- |
| Column 14 | Line 52 | In Claim 14, delete "alpha olefins" and insert --alpha-olefins-- |